(12) United States Patent
Biran et al.

(10) Patent No.: US 8,904,395 B2
(45) Date of Patent: Dec. 2, 2014

(54) SCHEDULING EVENTS IN A VIRTUALIZED COMPUTING ENVIRONMENT BASED ON A COST OF UPDATING SCHEDULING TIMES OR MAPPING RESOURCES TO THE EVENT

(75) Inventors: Ofer Biran, Haifa (IL); Tirtsa Hochberg, Haifa (IL); Michael Massin, Haifa (IL); Gil Rapaport, Moshav Moledet (IL); Yossi Shiloach, Mizpe Aviv (IL); Segev Eliezer Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 12/843,057

(22) Filed: Jul. 26, 2010

(65) Prior Publication Data
US 2012/0023499 A1   Jan. 26, 2012

(51) Int. Cl.
  G06F 9/46   (2006.01)
  G06F 9/50   (2006.01)
(52) U.S. Cl.
  CPC .................................. G06F 9/5066 (2013.01)
  USPC ............................ 718/102; 718/103; 718/104
(58) Field of Classification Search
  None
  See application file for complete search history.

(56) References Cited

U.S. PATENT DOCUMENTS

| | | | |
|---|---|---|---|
| 5,937,187 A * | 8/1999 | Kosche et al. | 718/104 |
| 6,029,205 A * | 2/2000 | Alferness et al. | 719/310 |
| 6,351,775 B1 * | 2/2002 | Yu | 709/238 |
| 7,164,687 B2 * | 1/2007 | Namihira | 370/412 |
| 7,383,548 B2 * | 6/2008 | Boon et al. | 718/102 |
| 2005/0091653 A1 | 4/2005 | Willehadson et al. | |
| 2005/0246705 A1 | 11/2005 | Etelson et al. | |
| 2006/0277307 A1 | 12/2006 | Bernardin et al. | |
| 2007/0028239 A1 | 2/2007 | Dyck et al. | |
| 2009/0070771 A1 | 3/2009 | Yuyitung et al. | |

FOREIGN PATENT DOCUMENTS

| | | |
|---|---|---|
| EP | 1269313 | 5/2009 |
| WO | 2009108344 | 9/2009 |

OTHER PUBLICATIONS

Sven Graupner et al., "Resource-Sharing and Service Deployment in Virtual Data Centers", 2002 IEEE. URL:http://ieeexplore.ieee.org/xpl/freeabs_all.jsp?arnumber=1030845.

* cited by examiner

*Primary Examiner* — Abdullah Al Kawsar
*Assistant Examiner* — Wissam Rashid

(57) ABSTRACT

Systems and methods for scheduling events in a virtualized computing environment are provided. In one embodiment, the method comprises scheduling one or more events in a first event queue implemented in a computing environment, in response to determining that number of events in the first event queue is greater than a first threshold value, wherein the first event queue comprises a first set of events received for purpose of scheduling, wherein said first set of events remain unscheduled; mapping the one or more events in the first event queue to one or more server resources in a virtualized computing environment; receiving a second set of events included in a second event queue, wherein one more events in the second set of event are defined as having a higher priority than one or more events in the first event queue that have or have not yet been scheduled.

12 Claims, 5 Drawing Sheets

SCHEDULING EVENTS IN A VIRTUALIZED COMPUTING ENVIRONMENT BASED ON A COST OF UPDATING SCHEDULING TIMES OR MAPPING RESOURCES TO THE EVENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing the scheduling of events in a virtualized computing environment and, more particularly, to a system and method for continuous placement of new events with various priorities into an existing schedule while minimizing event request rejection and maximizing virtual resource utilization.

BACKGROUND

Virtualized computing infrastructures, commonly referred to as cloud computing sites, utilize physical servers with virtualization capabilities for hosting multiple virtual servers. A virtual server is a computer system running on emulated hardware provided by the host. An event is generally defined by a collection of virtual servers and a projected time duration and time interval during which the virtual servers are to be hosted. Events are hosted by placing their virtual servers on hosts capable of running them.

Efficient scheduling of such events is important for the host that offers hosting services for a limited time. The core utilization of the host is defined by the ability to host more events in a given time frame while maximizing profitability and fault tolerance. Some hosts, such as International Business Machine (IBM®) Business Continuity and Resiliency Services (BCRS) centers, offer a recovery service in case a disaster strikes. The recovery service allows a customer to periodically rehearse pre-implemented disaster recovery plans.

The above noted rehearsal events generally encompass the majority of event activities in said hosts and tend to consume significant administrative and infrastructure resources. It is desirable to optimize the scheduling and management of these rehearsal events. Further, in case of a recovery from a true disaster, it is desirable for the host to allocate as many resources as possible to accommodate a projected recovery plan. Said allocation of resources is often accomplished at the expense of delaying planned or on-going rehearsal events. It is desirable to minimize the disturbance to the prescheduled rehearsals while maintaining profitability.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for scheduling events in a virtualized computing environment comprises scheduling one or more events in a first event queue, in response to determining that number of events in the first event queue is greater than a first threshold value, wherein the first event queue comprises a first set of events received for purpose of scheduling, wherein said first set of events remain unscheduled; mapping the one or more events in the first event queue to one or more server resources in a virtualized computing environment; receiving a second set of events included in a second event queue, wherein one more events in the second set of event are defined as having a higher priority than one or more events in the first event queue that have or have not yet been scheduled; and scheduling one or more events in the second queue in time slots assigned to one or more events in the first queue.

The one or more events in the second queue are mapped to one or more server resources in the virtualized computing environment that were assigned to one or more events in the first queue. The one or more events in the first queue may be rescheduled to different time slots depending on priority attributes associated with the events in the first queue and the second queue. The one or more events in the first queue may be remapped to different server resources in the virtualized computing environment depending on priority attributes associated with the events in the first queue and the second queue. It is noteworthy that the events may be assigned one or more priority levels and queued in one or more queues depending on implementation.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, a host may receive a series of service requests for scheduling one or more events. The requests are analyzed according to certain event attributes and constraints, such as, for example, event scheduling priority, rescheduling penalty, event duration, scheduled run time intervals, length of pendency of an event that has already started, progression rate of an event in relation to the total length of pendency of the event, etc. Based on the result of the analysis, it is determined which prescheduled events may be delayed, rescheduled or cancelled in favor of another more deserving or higher priority event.

Figure 1:
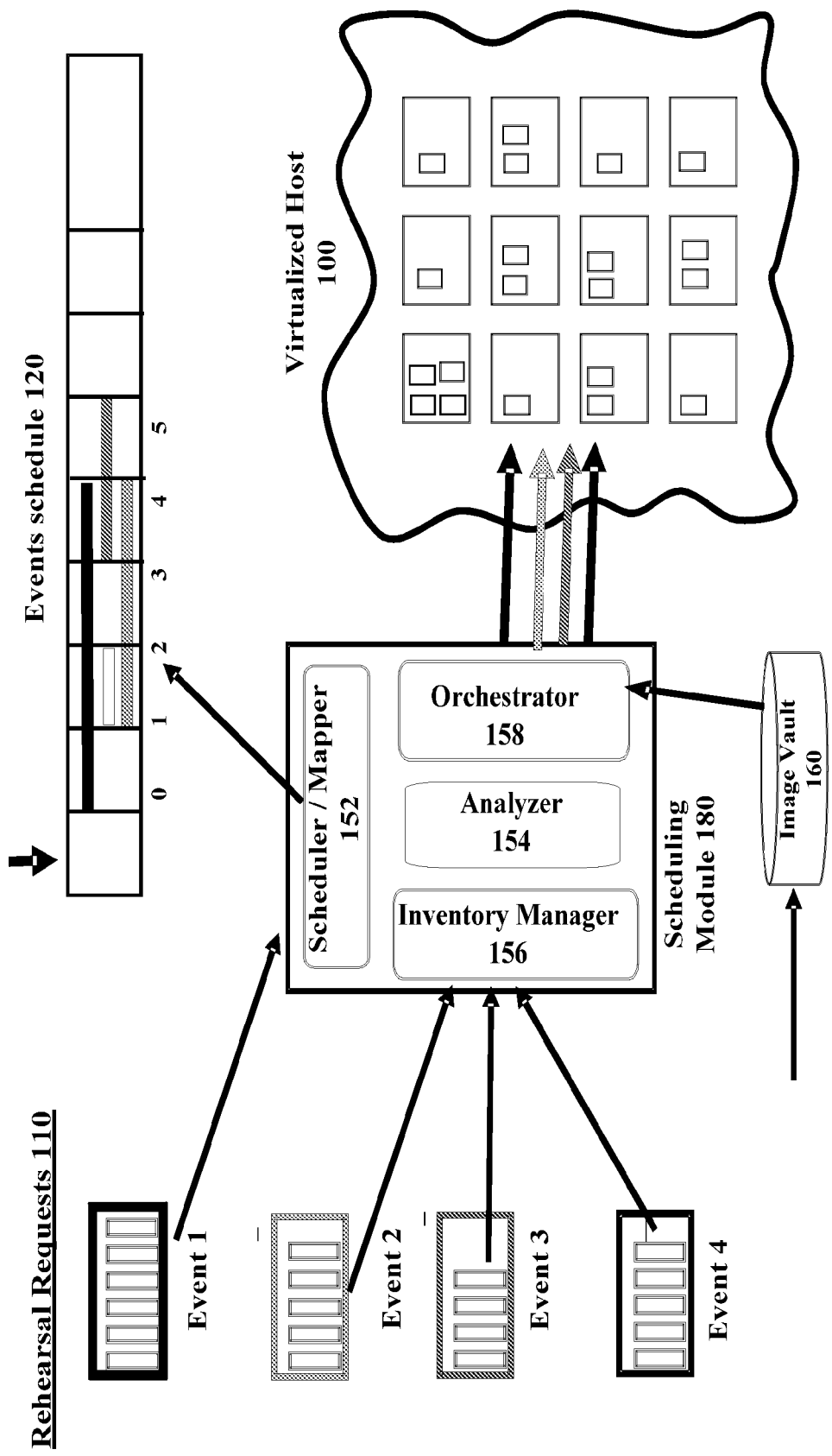
FIG. 1 illustrates an exemplary computing environment in accordance with one or more embodiments, wherein a virtualized host is implemented to service a plurality of requests.

Referring to FIG. 1, an exemplary computing environment is illustrated that may be utilized to implement the above process. As shown, a virtualized host 100 having a plurality of virtual servers may be implemented to receive event requests through a scheduling module 180. Depending on the nature of the hosting environment, without limitation, the requests may be rehearsal requests 110 submitted to an IBM BCRS center that offers disaster recovery services and allows a customer to periodically rehearse pre-implemented disaster recovery plans by way of scheduling disaster recovery events (e.g., events 1 through 4).

It is noteworthy that in different implementation, other types of events or requests may be submitted to virtualized host 100. Regardless of the type of request or event, in one embodiment, scheduling module 180 may be implemented to comprise at least one of a scheduler/mapper 152, an analyzer 154, an inventory manager 156, and an orchestrator 158. The scheduling module 180 includes or has access to one or more databases (not shown) that include customer data and metadata (e.g., disaster recovery data) that may be used for the purpose of processing or scheduling the requested events.

It should be noted that the naming conventions used here for referring to the components of the scheduling module 180 or other system components are by way of example and thus the particular component name shall not be interpreted to narrowly construe or otherwise define the functional or structural organization of the illustrated components in a manner that unduly limits the scope of the disclosed subject matter. In one embodiment, scheduler/mapper 152 is utilized to generate an events schedule 120 in a manner that the scheduling of the requested events is optimized among several virtual servers in virtualized host 100.

In one embodiment, the scheduler/mapper 152 may also map the requested events to one or more physical or virtual servers based on, for example, the events schedule 120 to optimize the use of virtualized host 100 resources. In some implementations, the scheduler/mapper 152 may be consolidated into one or a plurality of modules. Inventory manager 156 generates events from data gathered about customer machines either manually or automatically. Analyzer 154 analyzes the compatibility of each event server to different hosts. Orchestrator 158 executes the mapping prepared by the scheduler/mapper 152 by deploying event servers to their designated hosts. An image vault 160 may be provided as a repository for storing the images of the event servers that are later deployed onto the hosts.

Figure 2:
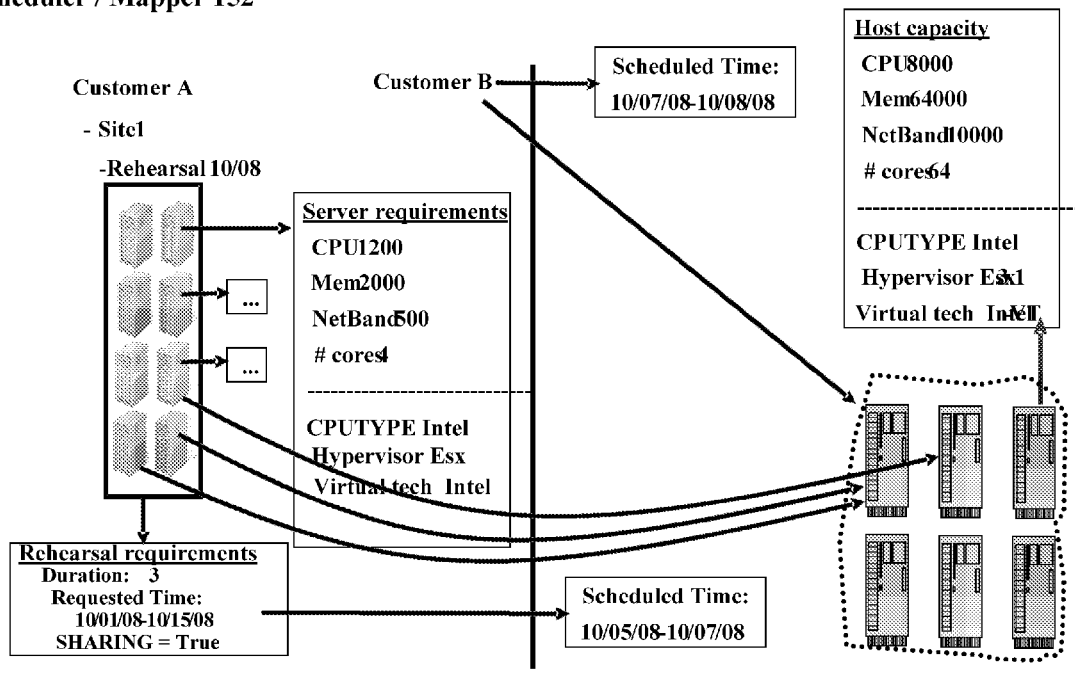
FIG. 2 is an exemplary block diagram of a scheduler/mapper system of the exemplary computing environment shown in FIG. 1, in accordance with one embodiment.

Referring to FIG. 2, in an exemplary implementation, a scheduler/mapper 152 may be utilized for optimizing the scheduling of rehearsal requests to a BCRS center. As shown, in an exemplary scenario, customer A may submit a rehearsal request to a site 1. The request may provide for certain server requirements or limitations (e.g., CPU power, CPU type, memory capacity, network bandwidth, etc.) and certain rehearsal requirements (e.g., duration of rehearsal, time and date of rehearsal, resource sharing options, etc.). At the same manner, customer B may submit a request that defines the same or other parameters that may need to be taken into consideration when scheduling the requested events submitted in request A.

As the number of submitted requests and customers increases, the chance of collision for using and accessing the designated resources for the various events also increases. Accordingly, scheduler/mapper 152 is configured to optimize the best possible event schedule and mapping for physical resources as available during the requested or scheduled times and dates. In addition to optimizing the scheduling and mapping of resources for certain predetermined events (e.g., rehearsal events) in advance, scheduler/mapper 152 is also configured to schedule and map events that are not prescheduled (e.g., disaster recovery requests or events that may be submitted in real time).

The unpredictable nature of the arrival of certain requests may result in the scheduler/mapper 152 to reschedule the time of initiation of certain prescheduled events, or in the alternative to cause the untimely abortion of certain events that may have already started according to an earlier set schedule, in an effort to accommodate higher priority events or events that may be categorically defined as more deserving of the resources mapped to a different event. In other words, when an event is scheduled, the virtualized host 100 commits to the scheduled request with respect to execution time. Should additional requests for the same time frame arrive, host 100 may try to reassign the allocated resources to service the newly requested events while preferably preserving the start and end times already assigned to the previously scheduled events.

In one embodiment, it may be desirable to optimize the scheduling of the requested events so that host 100 may host as many events as possible in a given time frame, and thus maximize the utilization of the physical resources of host 100 and profitability, in general. In some embodiments, it may also be desirable to minimize the total amount of server days used to host the requested events. In an exemplary implementation, for a server S and day D, <S,D> represents a server day where server S is busy in day D. Minimizing server days may enable better power utilization at the host 100 level, for example, by enabling some physical servers to be powered down during periods when no events are scheduled to be executed.

In accordance with one embodiment, a time frame (TF) may be designated for each requested event, where TF denotes the scheduling time frame in which host 100 is scheduled to service one more events. TF may be defined by a starting and ending time (e.g. Jan. 1, 2010 to Dec. 31, 2010). During the time frame TF, customers may want to schedule less critical (e.g., rehearsals) or more critical (e.g., real-time invocations) events. As provided earlier, each event may characterized by:

- A set of server requests
- Duration
- A set of possible start intervals
- Sharing/non-sharing option
- Priority A server request may be characterized by the resources that are needed to service that request, such as, CPU attributes, number of processing cores or servers, memory, storage and network bandwidth. The schedule/mapper 152, in addition to taking into consideration the above resource characteristics, may also take into account the existing event schedule in terms of pre-scheduled or running events, unavailability of resources (e.g. planned maintenance, known malfunctions at the time, etc.) and taboo periods (e.g., times where certain events such as rehearsals are not to be scheduled for various reasons).

Since scheduling is an ongoing real-time process, a progressive state for each event is defined or determined which reflects the growing commitment of the host 100 resources to the events scheduling and mapping. In one embodiment, at the earlier states, the scheduler/mapper 152 is committed to the scheduled dates and times while providing for remapping the servers to allow new events to be scheduled. In one exemplary implementation, events that are in a more progressive state (e.g., already started) maintain their mapping and scheduling, while events that are in the less progressive states (e.g., not started or recently started events, or events that are scheduled but not started, or scheduled and confirmed) are rescheduled to a later time or mapped to other resources in host 100.

It is noteworthy that the rescheduled or remapped events may not fully comply with the customer requested specification. The scheduler/mapper 152 is, however, configured to reschedule or remap said events to the other available times or resources that best meet the host's profitability and other predefined requirements. For example, certain events (e.g., real-time invocation) may be determined as taking precedence over other events (e.g., rehearsals). If so, the lower priority events may get rescheduled or remapped in order to free sufficient resources to service the higher priority events. As noted, the scheduler/mapper 152 may even cancel events in less progressive states to minimize customer dissatisfaction and maintenance needs. With event cancellation as the only alternative, the scheduler/mapper 152 may suggest a mapping that violates so-called 'soft' restriction (e.g. that co-locates servers requested to be hosted on separate hosts or that shares host with other customers despite the customer's request for isolation). The customer may then either accept or reject this best-effort mapping.**

In accordance with one or more embodiments, a computer implemented problem may be defined as having two dimensions, where the first dimension is the time dimension, and the second dimension is the resources dimension. Each event may be associated with a time interval of event duration length within TF, such that it's starting point falls within the allowed start interval set. Each server request of a scheduled event may be mapped to a physical server without overloading the physical server's resources and respecting the non-sharing constraints. These two dimensions may be interleaved and not independently solvable.

The resources dimension of the problem is a multi-dimensional problem with regard to the various resources that are to be allocated simultaneously. The two dimensions above deal with problem feasibility. The third dimension is the optimization dimension, where it is desirable to schedule as many events as possible in a given time frame. It is also desirable to reduce the energy consumption of the physical servers by minimizing the amount of server-days in the solution. As noted earlier, a server-day may be defined as a pair of server S and day D such that S is 'busy' at day D.

The following data may be used to define the complexity and the size of the optimization problem:

- Number of physical servers
- Number of server requests within the time frame
- Number of time intervals.

The timeline may be broken down into discrete time intervals, such that in each time interval an event is either scheduled for the entire interval, or not scheduled. For example, if an hour resolution is used and the time frame is one year, the number of intervals is 8700. In accordance with one embodiment, the optimization problem may be defined as a mixed integer programming (MIP) optimization problem.

Figure 3:
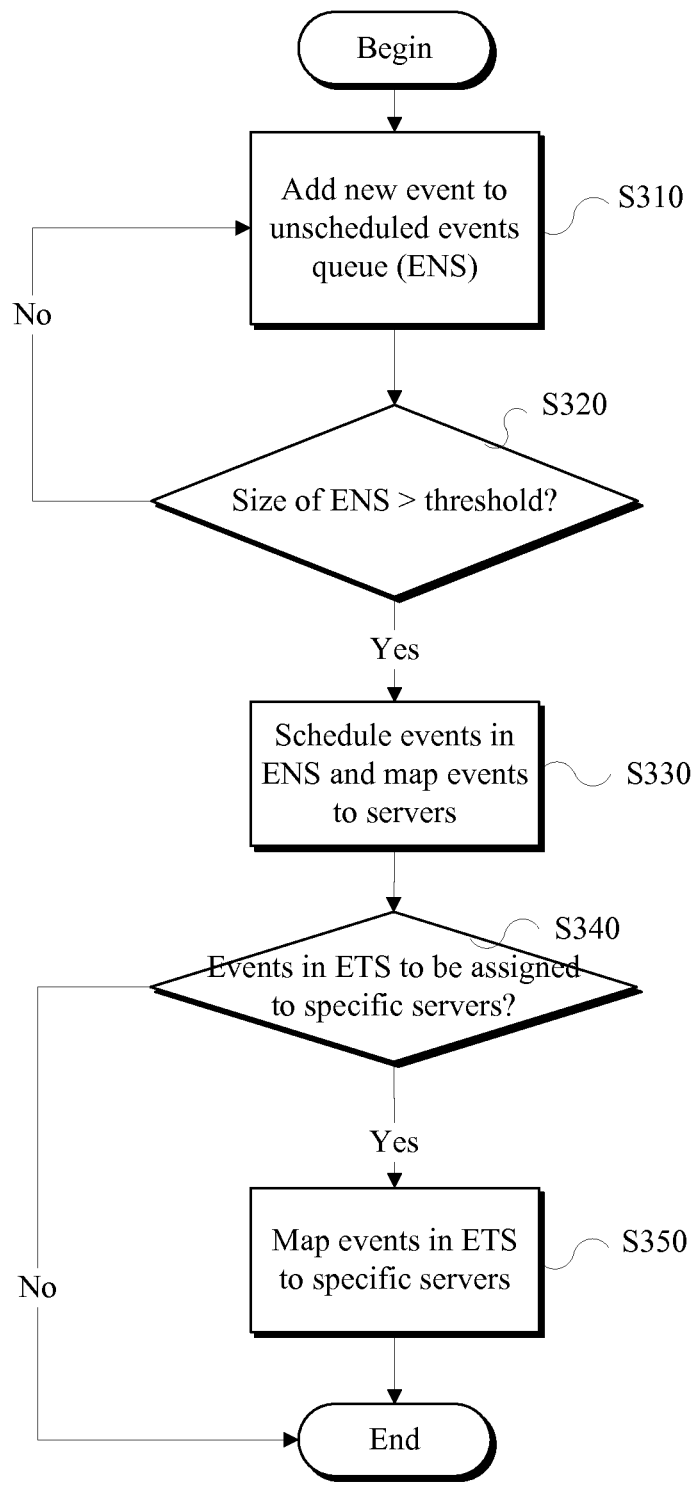
FIG. 3 is a flow diagram of an exemplary method for optimizing the scheduling of events in accordance with one embodiment.

In one implementation, the optimization problem may be solved using a MIP solver, where a problem-specific MIP optimization model is created by translating the problem to a set of linear constraints and an objective function, for example. The optimization model may be used as part of a process for planning the scheduling of events. One exemplary implementation of the process is provided in the following:

1) Referring to FIG. 3, at each point in time t, there may be three sets of events:
   a) A set of events (rehearsal and known invocation requests) that have come in and have not been scheduled yet ($ENS_t$).
   b) A set of events that have come in and whose time has been determined, but have not yet been assigned to specific servers ($ETS_t$). It is noteworthy that in some embodiments events are mapped to specific servers when successfully scheduled, but this mapping is tentative and may be changed later based on dynamic scheduling attributes until the event is marked as finalized—for example, an event may be finalized a few days before the event's planned deployment to allow time for preparing the requisite equipment. In other words, until an event is finalized, the scheduling is performed based on a proposed mapping to available resources where the proposed mapping remains updatable until finalized.
   c) A set of events for which both the event times, and specific servers, have been determined ($ESS_t$).
2) When a new event E arrives:
   a) E is added to $ENS_t$, i.e., the set of non scheduled events [S310].
   b) If the size of $ENS_t$ has reached some threshold n, i.e. $|ENS_t|=n$ [S320], then trigger the optimization algorithm to schedule the events in $ENS_t$ [S330], desirably while ensuring the time commitments of the events $ETS_t$, and the time and server commitments of $ESS_t$. Note that it could be that n=1, in which case, the optimization is rerun for each new event.
   c) Update $ETS_t$ and $ESS_t$, each with the relevant events from $ENS_t$.
3) When there are events in $ETS_t$ which must be assigned to specific servers [S340]:
   a) Rerun the optimization algorithm so as to map these events to specific servers [S350], while maintaining the time commitments of the events $ETS_t$, and the time and server commitments of $ESS_t$. As noted earlier, the scheduled events, depending on implementation, may be mapped to specific servers, but this mapping is tentative until the event as finalized.

b) Update $ETS_t$ and $ESS_t$ accordingly.

In one exemplary embodiment, the problem may be modeled into a mixed integer model based on the following principals:

1) The timeline is broken down into discrete time intervals, so that for each time interval it can be assumed that either an event is scheduled for the entire time interval, or an event is not scheduled for the entire time interval.

2) Based on this discretization, a mixed integer model is created such that the basic variables whose value are determined are the following:

a) Event Start: ES (E, I) may be a binary variable defined for an event and interval, whose value is set (e.g., to 1) if and only if interval I is the first time interval in which event E starts, for example—this refers to when a request is received (E=Request, I=Interval).

b) Event Start Wave: ESW (E, I) may be a binary variable defined for an event and interval, whose value is set (e.g., to 1) if and only if event E was scheduled to start prior to time interval I, for example.

c) Event Wave: EW (E, I) may be a binary variable defined for an event and interval, whose value is set (e.g., to 1) if and only if the time at which event E is scheduled includes interval I, for example.

d) Requirement Mapping: RMAP (R, S) may be a binary variable whose value is set (e.g., to 1) if and only if request R is mapped to server S, for example.

e) Requirement mapping at interval: RSI (R, S, I) real in [0, 1] may be a binary variable whose value is set (e.g., to 1) if and only if request R is mapped to server S and the event to which R belongs, spans over interval I, for example—this refers to a request that is mapped to servers S during interval I.

Based on the above variables, the constraints and functions for the problem may be defined. Additional exemplary details that may be utilized in formulation of the problem according to one or more embodiments are provided below:

Input Data:

Time Frame (TF): Defined by start_Time and end_Time (date+hour)

Time Intervals: Interval Number (1, 2, 3, ... )
  Interval 1 starts at Start Time and the last interval ends at End Time Event: An event contains data regarding its duration, the allowed start times, whether or not it can be shared, and a description of the required resources. The required resources may include data such as the CPU type, number of cores, required memory, and bandwidth.

A description of the physical servers available: Includes data such as CPU type, number of cores, memory, memory, network bandwidth and whether or not it has a virtualization capability.

Penalty Constants:

EventUnschedledPenalty: A penalty for an unscheduled event.

UnmappedRequirementPenalty: A penalty for an unmapped requirement.

SharingViolationPenalty: Given when non-sharing events share a server.

PowerSavingPenaltyVar: Given for every server and time interval if the server is busy at this time interval.

The numerical values of the penalty constants are to be tuned up by the model designer in a way that reflects the user preferences.

Penalty Variables:

EventUnscheldedPenaltyVar (E)—real in [0,1] for each event E.

UnmappedRequirementPenaltyVar (R)—real in [0,1] for each server requirement R.

SharingViolationPenaltyVar (E1, E2, S)—real for each pair of non sharing events and server S.

PowerSavingPenaltyVar—real

Constraints: Based on the above input and data, the set of constraints are defined. Examples include:

Variable Constraints:

RSI: request S for Source S at time interval I

RMAP: Map a request R physically to server S

EW: Event Wave

RSI (R, S, I)<=RMAP (R, S)—i.e. if resource R is mapped to server S at interval I, then it may be indicated that server R is mapped to server S.

RSI (R, S, I)<=EW (E, I) where E is the event to which R belongs.

$$RSI(R,S,I) >= EW(E,I) + RMAP(R,S) - 1$$

(This is an implementation of the minimum relation:

$$RSI(R,S,I) = minimum(RMAP(R,S), EW(E,I))$$

where R belongs to E.)

The constraints above are the MIP formulation of the equation:

$$RSI(R,S,I) = minimum(RMAP(R,S), EW(E,I)).$$

Event—Server Indicator: ESi (E, S) real in [0,1], implied integer.

Interpretation: At least one of the requirements in event E is mapped to server S.

Defining Constraints:

For all R in E: ESi (E, S)>=RMAP (R, S)

ESi (E, S)<=sum R in E: RMAP (R, S)

The constraints above are the MIP formulation of the equation:

$$ESi(E,S) = maximum\ R\ in\ E: (RMAP(R,S).$$

Mapping server requirement to one server: A server requirement is mapped to at most one physical server.

Implementation:

sum over all servers S: RMAP (R, S)<=1 sum over all servers S: RMAP (R, S)+UnmappedRequirementPenaltyVar (R)>=1

A Target Server Without Virtualization Capability Can Host At Most One Server Request:

For each target server S with no virtualization capability:
  Sum over all server requirements R: RMAP (R, S)<=1.

The Objective Function:

Sum over all events E of EventUnschedledPenalty*
EventUnschedledPenaltyVar (E)
+sum over all server requirements R
UnmappedRequirementPenalty*UnmappedRequirementPenaltyVar (R)
+Sum over all non sharing event pairs E1, E2 and server S:
  SharingViolationPenalty*SharingViolationPenaltyVar (E1, E2, S)
+PowerSavingPenalty*PowerSavingPenaltyVar In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
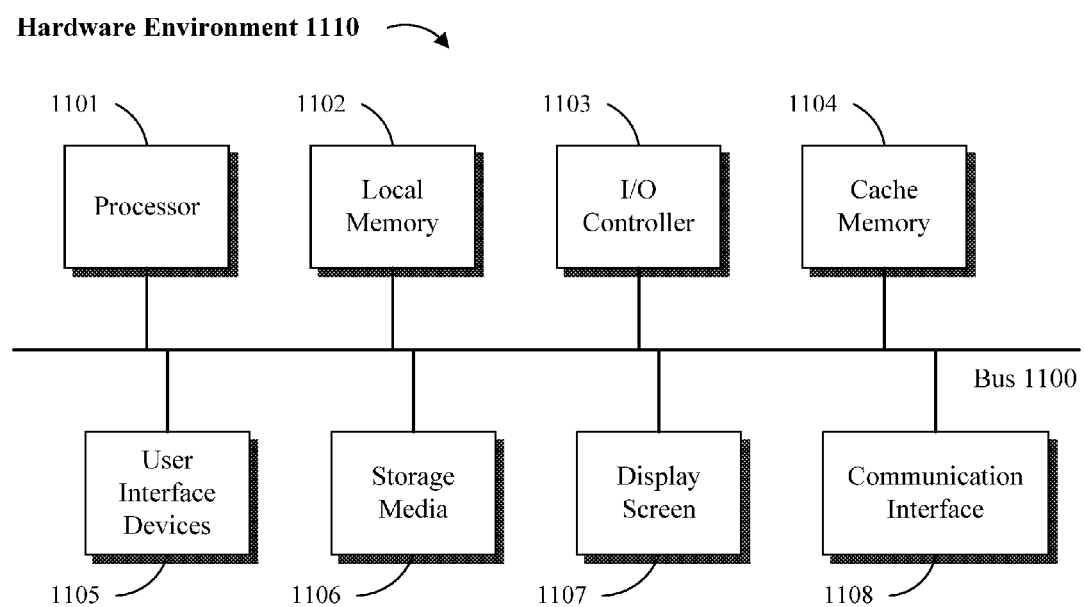
FIGS. 4A and 4B are block diagrams of hardware and software environments in which the disclosed systems and methods may operate, in accordance with one or more embodiments.
Figure 4B:
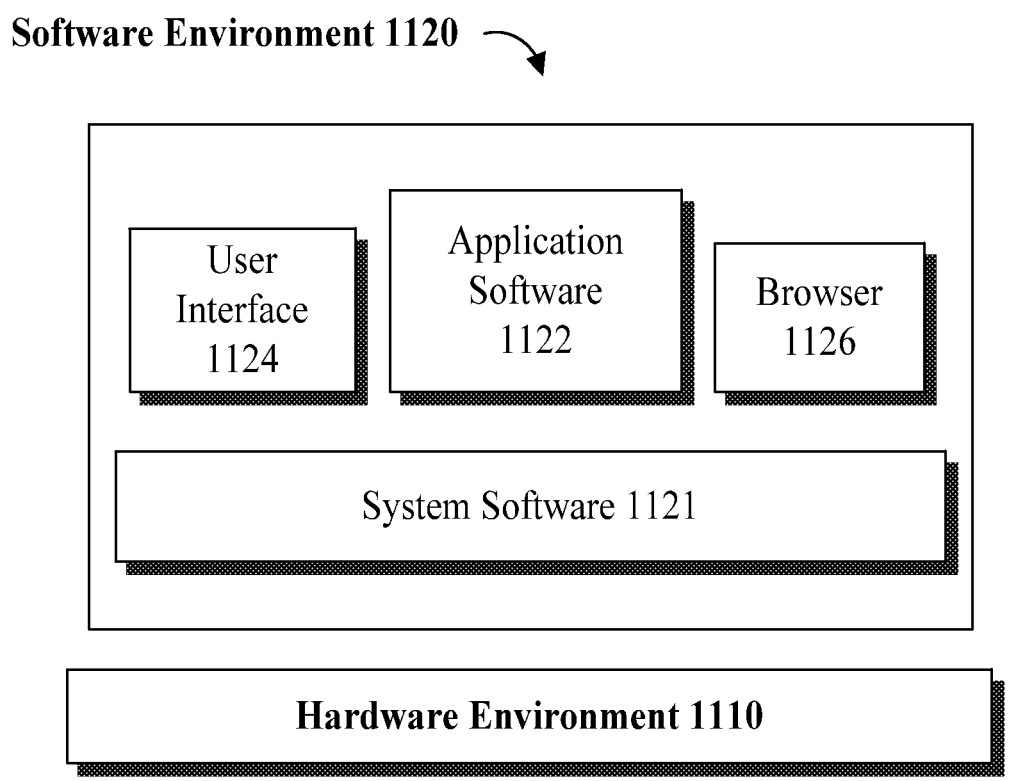

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 1110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer implemented method for scheduling events in a virtualized computing environment, the method comprising:

adding one or more events to a first queue implemented in the virtualized computing environment, in response to receiving one or more requests for the one or more events to be processed, wherein the first queue comprises a first set of events received for purpose of scheduling, wherein the first set of events remain unscheduled;

removing a first event from the first set of unscheduled events in the first queue, and scheduling the first event for processing at a first scheduled time, in response to determining that a number of events in the first queue is greater than a first threshold value;

adding the first event to a second queue in a queue order, wherein the queue order in the second queue is based on one or more priority attributes associated with the first event, such that the scheduling is performed to favor processing of higher priority events over lower priority events, wherein the second queue includes another set of events that are scheduled for processing, but are not mapped to a server to be processed;

removing the first event from the second queue based on the queue order and mapping the first event to one or more server resources in the virtualized computing environment;

adding the first event to a third queue in a queue order, wherein the queue order in the third queue is based on the priority attributes associated with the first event, wherein the third queue includes a set of events that are both scheduled for processing and are mapped to a server to be processed, wherein the first scheduled time or the server resources mapped to the first event in the third queue are updated, based on the priority attributes associated with the first event, in response to determining that:

a second event with higher priority attributes is added to the third queue, wherein there exists a time schedule or resource conflict for processing the first event and the second event, and cost of updating the first scheduled time or the server resources mapped to the first event is below a threshold level;

wherein, if the processing of the first event has already started, the processing continues based on at least the length of the processing of the first event and the time remaining for the processing of the first event to be complete.

2. The method of claim 1, wherein movement of the first event between the first, second and third queues and placement of the first event in each queue is dependent on priority attributes associated with other events pending in the first, second and third queues, such that scheduled time for processing the first event and server resources mapped to the first event do not conflict with the scheduling and resource allocation to the other events in the first, second and third queues, and such that higher priority events are scheduled and processed ahead of lower priority events.

3. The method of claim 1, wherein the priority attributes comprise information about an event's scheduling priority in comparison with other events.

4. The method of claim 1, wherein the priority attributes comprise information about an event's rescheduling penalty.

5. The method of claim 1, wherein the priority attributes comprise information about an event's duration.

6. The method of claim 1, wherein the priority attributes comprise information about an event's scheduled run time intervals.

7. The method of claim 1, wherein the priority attributes comprise information about an event's length of pendency.

8. The method of claim 1, wherein the priority attributes comprise information about an event's progression rate in relation to the total length of pendency of the event.

9. A computer implemented system for scheduling events, the system comprising:

a processor;

a logic unit for adding one or more events to a first queue implemented in a virtualized computing environment, in response to receiving one or more requests for the one or more events to be processed, wherein the first queue comprises a first set of events received for purpose of scheduling, wherein the first set of events remain unscheduled;

a logic unit for removing a first event from the first set of unscheduled events in the first queue, and for scheduling the first event for processing at a first scheduled time, in response to determining that a number of events in the first queue is greater than a first threshold value;

a logic unit for adding the first event to a second queue in a queue order, wherein the queue order in the second queue is based on one or more priority attributes associated with the first event, such that the scheduling is performed to favor processing of higher priority events over lower priority events, wherein the second queue includes another set of events that are scheduled for processing, but are not mapped to a server to be processed;

a logic unit for removing the first event from the second queue based on the queue order and mapping the first event to one or more server resources in the virtualized computing environment; and a logic unit for adding the first event to a third queue in a queue order, wherein the queue order in the third queue is based on the priority attributes associated with the first event, wherein the third queue includes a set of events that are both scheduled for processing and are mapped to a server to be processed, wherein the first scheduled time and the server resources mapped to the first event in the third queue are updated, based on the priority attributes associated with the first event, in response to determining that:

a second event with higher priority attributes is added to the third queue, wherein there exists a time schedule or resource conflict for processing the first event and the second event, and cost of updating the first scheduled time or the server resources mapped to the first event is below a threshold level;

wherein, if the processing of the first event has already started, the processing continues based on at least the length of the processing of the first event and the time remaining for the processing of the first event to be complete.

10. The system of claim 9, wherein movement of the first event between the first, second and third queues and placement of the first event in each queue is dependent on priority attributes associated with other events pending in the first, second and third queues, such that scheduled time for processing the first event and server resources mapped to the first event do not conflict with the scheduling and resource allocation to the other events in the first, second and third queues, and such that higher priority events are scheduled and processed ahead of lower priority events.

11. A computer program product comprising logic code embedded in a non-transitory data storage medium, wherein execution of the logic code on a computer causes the computer to:

add one or more events to a first queue implemented in a virtualized computing environment, in response to receiving one or more requests for the one or more events to be processed, wherein the first queue comprises a first set of events received for purpose of scheduling, wherein the first set of events remain unscheduled;

remove a first event from the first set of unscheduled events in the first queue, and scheduling the first event for processing at a first scheduled time, in response to determining that a number of events in the first queue is greater than a first threshold value;

add the first event to a second queue in a queue order, wherein the queue order in the second queue is based on one or more priority attributes associated with the first event, such that the scheduling is performed to favor processing of higher priority events over lower priority events, wherein the second queue includes another set of events that are scheduled for processing, but are not mapped to a server to be processed;

remove the first event from the second queue based on the queue order and mapping the first event to one or more server resources in the virtualized computing environment; and add the first event to a third queue in a queue order, wherein the queue order in the third queue is based on the priority attributes associated with the first event, wherein the third queue includes a set of events that are both scheduled for processing and are mapped to a server to be processed, wherein the first scheduled time and the server resources mapped to the first event in the third queue are updated, based on the priority attributes associated with the first event, in response to determining that:

a second event with higher priority attributes is added to the third queue, wherein there exists a time schedule or resource conflict for processing the first event and the second event, and cost of updating the first scheduled time or the server resources mapped to the first event is below a threshold level;

wherein, if the processing of the first event has already started, the processing continues based on at least the length of the processing of the first event and the time remaining for the processing of the first event to be complete.

12. The computer program product of claim 11, wherein movement of the first event between the first, second and third queues and placement of the first event in each queue is dependent on priority attributes associated with other events pending in the first, second and third queues, such that scheduled time for processing the first event and server resources mapped to the first event do not conflict with the scheduling and resource allocation to the other events in the first, second and third queues, and such that higher priority events are scheduled and processed ahead of lower priority events.

* * * * *